(No Model.) 6 Sheets—Sheet 2.

H. W. SOUDER.
VELOCIPEDE.

No. 544,776. Patented Aug. 20, 1895.

Witnesses
Arthur Ashley
Walter S. Dodge

Inventor
Howell W. Souder
by
Attorney

(No Model.) 6 Sheets—Sheet 3.

H. W. SOUDER.
VELOCIPEDE.

No. 544,776. Patented Aug. 20, 1895.

Witnesses
Arthur Ashley
Walter S. Dodge

Inventor
Howell W. Souder
by [signature]
Attorney

(No Model.) 6 Sheets—Sheet 4.

H. W. SOUDER.
VELOCIPEDE.

No. 544,776. Patented Aug. 20, 1895.

Witnesses:
Arthur Ashley
Matta S. Dodge

Inventor
Horrell W. Souder
by
J. W. Kiley
Attorney (No Model.) 6 Sheets—Sheet 5.

H. W. SOUDER.
VELOCIPEDE.

No. 544,776. Patented Aug. 20, 1895.

Witnesses
Arthur Ashley
Walter S. Dodge

Inventor
Howell W. Souder
by

Attorney (No Model.)  6 Sheets—Sheet 6.

H. W. SOUDER.
VELOCIPEDE.

No. 544,776. Patented Aug. 20, 1895.

Witnesses.
Arthur Ashley
Walter S. Dodge

Inventor.
Howell W. Souder:
by

Attorney.

UNITED STATES PATENT OFFICE.

HOWELL W. SOUDER, OF TAMAQUA, PENNSYLVANIA.

VELOCIPEDE.

SPECIFICATION forming part of Letters Patent No. 544,776, dated August 20, 1895.

Application filed August 3, 1894. Serial No. 519,344. (No model.)

*To all whom it may concern:*

Be it known that I, HOWELL W. SOUDER, a citizen of the United States, and a resident of the town of Tamaqua, in the county of Schuylkill, in the State of Pennsylvania, have invented a new and useful Velocipede, of which the following is a correct description.

The leading object of the invention is to provide an attachment which is applicable to velocipedes generally, for simultaneously changing the speed and the power of the machine, so that in ascending acclivities the rider is enabled, while still remaining in his seat, to increase the leverage exerted upon the traveling wheels, while diminishing correspondingly the frequency of their revolutions; and also by the same means to increase the leverage when descending a declivity, and thus with ease resist the tendency to undue acceleration of the speed of the vehicle; and also so that in running the machine upon level planes a "high gear" may be employed to render easy and rapid the pedaling operation.

The invention consists in part in the provision in a velocipede of a series of interconnected wheels and a means by which, at the will of the cyclist, the interconnected wheels are caused to operate either in connection with the frame or in connection with the sprocket-wheel of the machine, whereby the leverage exerted upon the propelling-wheel may be varied at will.

The invention consists, also, in a novel brake, the brake-rod being so modified from the ordinary construction as to impart to it a twofold function—that is, to enable it to be so operated as, in addition to its ordinary function, to connect or to disconnect the gearing by means of which the leverage is diversely applied to the velocipede or bicycle wheel.

The invention consists, also, in novel appliances in connection with the rear wheel of a velocipede and in connection with the sprocket-wheel of such rear wheel, whereby the power exerted in propulsion is made available in obtaining additional different rates of speed without change in the rate of pedaling—that is, without increase or diminution of the power exerted in propelling the vehicle.

The invention consists, also, in the provision of a novel mechanism upon the power or driving wheel of a velocipede in connection with the main sprocket-wheel thereof, whereby either a high or a low gear for such wheel may be obtained; and in the provision of mechanism upon the small sprocket-wheel of the rear wheel of such velocipede, whereby either a high or a low gear for such wheel may be obtained, so that in the conjoint operation of the two wheels any one of four dissimilar rates of speed may be obtained, and any one of four dissimilar degrees of propulsive power may be exerted without change in the degree of effort exerted by the wheelman.

The invention consists, also, in various novel parts or combinations of parts in a velocipede, as will first be described with particularity, and then distinctly specified in the claims which follow such detailed description.

In the accompanying drawings, which constitute a part of this specification, Figure 1 represents, in two disconnected fragments, a side elevation showing the sprocket-wheel and its pivoted lock and catch and portions of the frame, the sprocket-chain, and the handle-standard, together with the brake-rod, its lever and spring, and the parts which operate in connection therewith to actuate the mechanism for varying the leverage upon the propelling-wheel. Fig. 1ᵃ is a top plan view in the line 7 7 of Fig. 1.

Fig. 12 is a central section of a construction showing portions of the mechanism represented in Figs. 9 and 10, as when adapted for use in connection with a chainless machine. Fig. 12$^a$ is a side elevation, portions being broken out and the scale being reduced, of the construction seen in Fig. 12. Fig. 13 represents a detail side elevation showing the brake and the locking mechanism as when applied to a machine of the "diamond-frame" type. Fig. 14 represents a view, in front elevation, of portions of the mechanism seen in Fig. 13. Fig. 15 represents an elevation of the intermediate plate with the primary and secondary gear-wheels mounted thereon, as in Figs. 2, 3, and 4, but showing three instead of two double-gear wheels mounted in connection with the central gear-wheels. Fig. 16 represents an elevation similar to that shown in Fig. 15, but showing a single double-gear wheel only in connection with the central gear-wheels.

Figures 1, 1A:
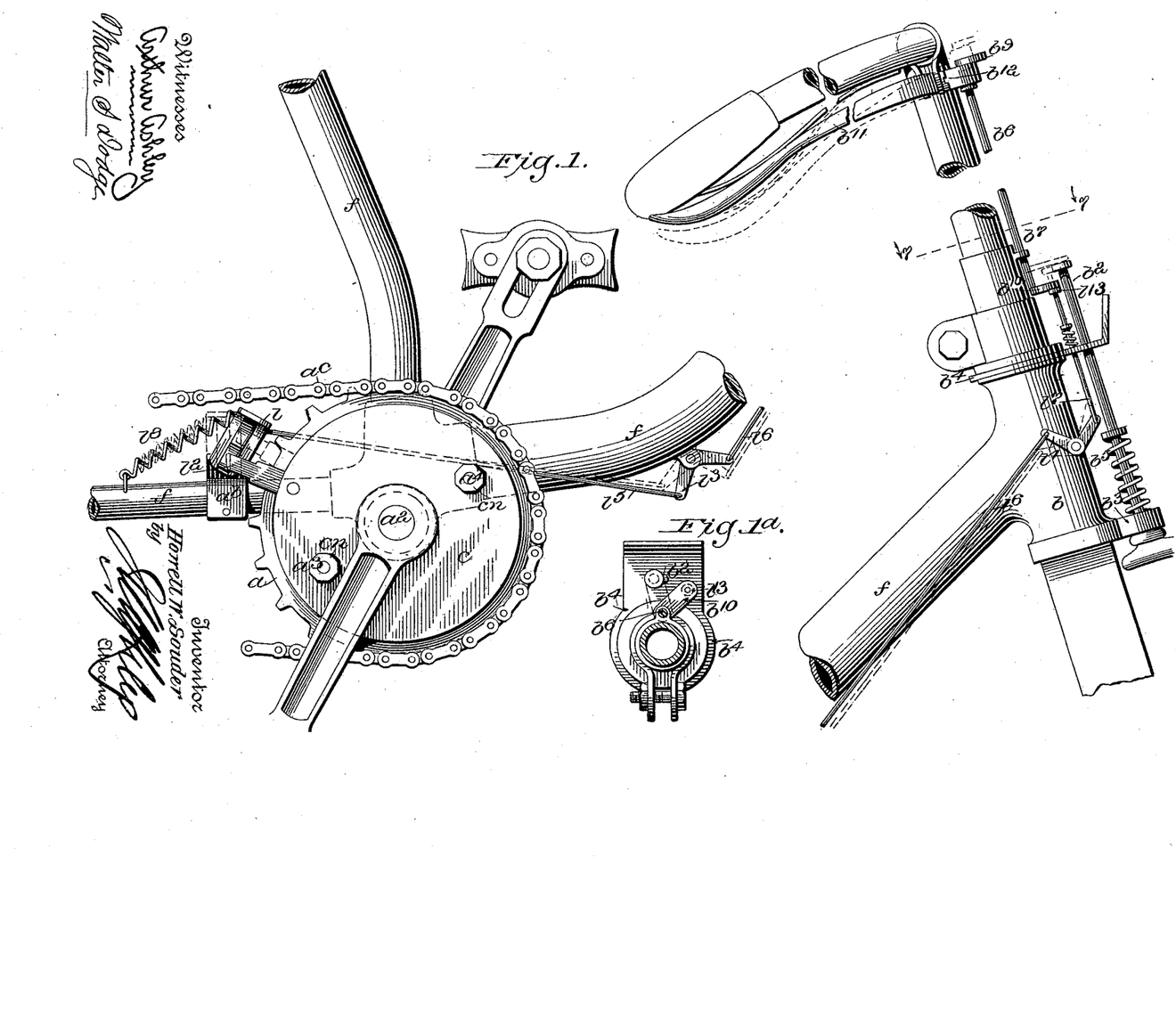

Referring now more in detail to the several figures, it will be understood that under the construction represented in Fig. 1 the frame $f'$ is that of a machine adapted to a lady's use, and that in that figure, in connection with the sprocket-wheel $a$ and the sprocket-chain $ac$, are shown the pivoted lock $l$, the catch or arm $l^2$, the retracting-spring $l^8$, bell-crank levers $l^3$ and $l^4$, and connecting-rods $l^5$, $l^6$, and $l^7$, the lever $l^3$ being mounted upon the frame $f$ and the lever $l^4$ being mounted upon the standard $b$ of the guide-wheel. In the same figure, in coincidence with the pedal-shaft $a^2$, are seen the inner extremity of the spindles or journals $a^3$ and $a^4$, upon which are mounted the outer gear-wheels $a^7$ and $a^8$, to be further described, and the base or seat $ab$, upon which is mounted the lock $l$. In the right-hand portion of the figure are seen the brake-rod $b^2$, its guides and supports $b^3$ and $b^4$, and its upwardly-thrusting spring $b^5$, and also the secondary or auxiliary rod $b^6$, movable in its bearings $b^7$ and $b^{12}$, and provided with the outwardly-projecting holding head or arm $b^9$, and rod-engaging foot $b^{10}$, the former resting upon the eye $b^{12}$ of the brake handle or lever $b^{11}$, and the latter bearing upon the cap $l^{13}$ of the connecting-rod $l^7$.

Figure 2:
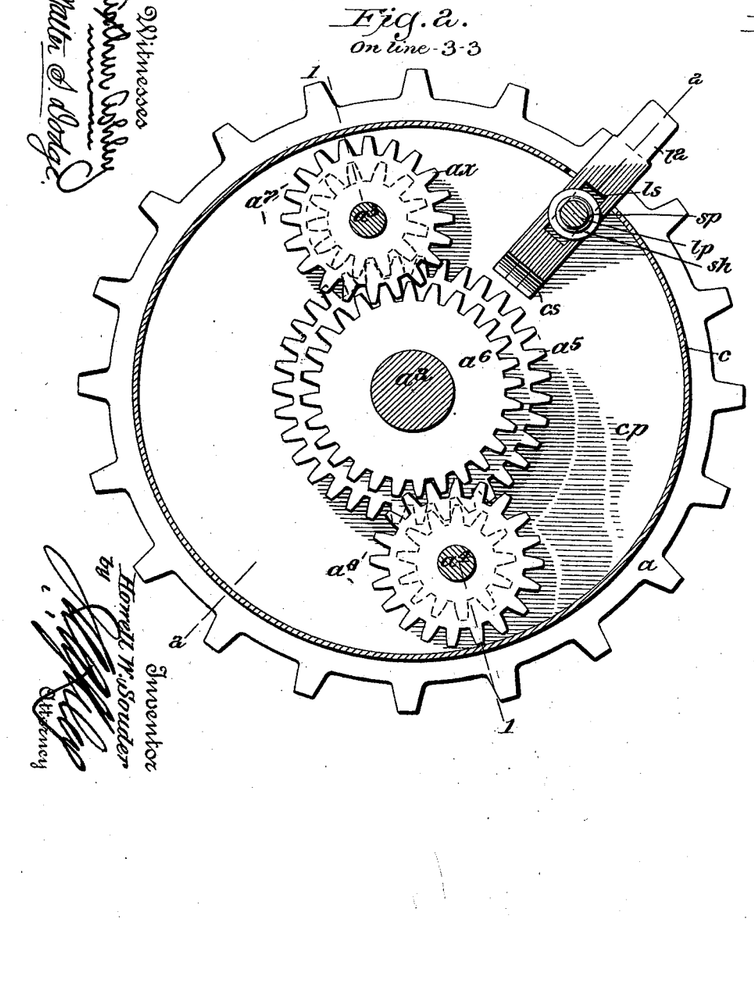
Fig. 2 represents a section through the gear-containing case, portions being in elevation, as in the line 3 3 of Fig. 4.
Figure 3:
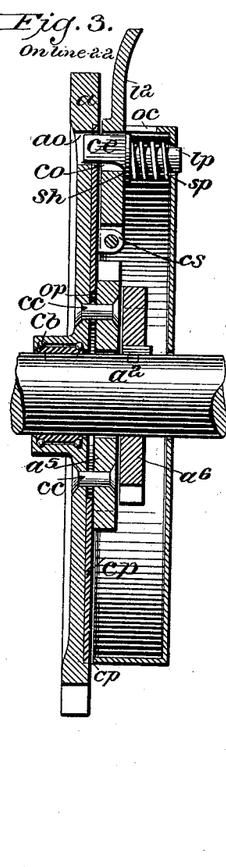
Fig. 3 is a vertical central section of the sprocket-wheel and gear-containing case, as in the line 2 2 of Fig. 2, but showing the inclosing-case intact.
Figure 4:
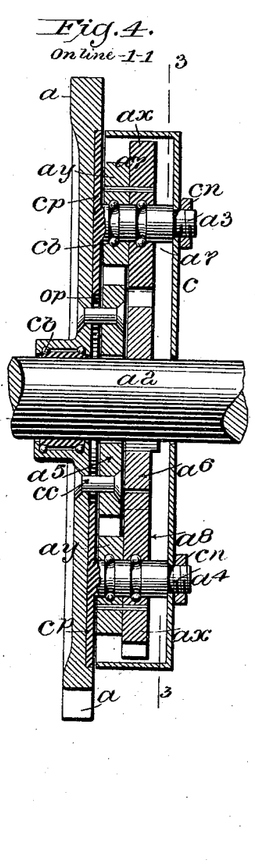
Fig. 4 is a central section through the sprocket-wheel and gear-containing case, as in the line 1 1 of Fig. 2.

In Figs. 2, 3, and 4 are further shown the relation of the cog-wheels, the containing-case $c$, and portions of the adjusting mechanism for effecting change of gear or variation of the leverage, as applied for use in connection with an already-completed bicycle, and as partially represented in Fig. 1. As will be understood from the illustrations, the larger cog-wheel $a^5$ is rigidly connected to the sprocket-wheel $a$, but is loose upon the power-shaft. The secondary cog-wheel $a^6$, concentric with the larger cog-wheel $a^5$, is rigidly secured to the pedal or power shaft $a^2$, and the two-part or double wheels $a^7$ and $a^8$, each embracing larger outer member $ax$ and smaller inner member $ay$, are mounted upon the spindles or journals $a^3$ and $a^4$ of the intermediate plate $cp$, as will be explained, the member $ax$ being in engagement with the secondary central wheel $a^6$, and the member $ay$ being in engagement with the primary central wheel $a^5$. In these figures the circular case $c$ is represented as applied by the edges of its open side or face upon the outer side of a sprocket-wheel $a$, in connection with an intermediate plate $cp$, which, as here shown, is slightly countersunk or let into the body of the sprocket-wheel, which thus embraces and supports it by its outer periphery, while its inner periphery, which encircles the opening $op$ and which encircles also the connections $cc$, which unite the primary central gear-wheel and the sprocket-wheel proper, is loosely received and supported between such wheels.

At opposite sides of the pedal or power shaft and equidistant therefrom are the spindles $a^3$ and $a^4$, upon which are received, respectively, the gear-wheels $a^7$ and $a^8$, the spindles being either formed with the plate $cp$ or rigidly connected thereto, their outer extremities projecting through the outer face of the case. Friction of the wheels upon the spindles or shafts is relieved by suitable ball-bearings $cb$, moving in grooved ways, and holding-nuts $cn$, upon the projecting extremities of the spindles, serve to secure the connection of the containing-case, the gear-wheels, and the intermediate plate $cp$.

Near the outer periphery of the larger gear-wheel $a^5$, upon a short standard $cs$, which projects from the interminate plate $cp$, is pivoted the latch or lifting arm $l^2$, which at about its mid-length has an open slot $ls$ to receive the engaging extremity $ce$ of a catch or locking-pin $lp$, the outer extremity of which is encircled by a holding-spring $sp$, which bears against the inner face of the containing-case $c$ and against a shoulder or seat $sh$ upon the body of the pin and causes it to engage coincident openings $co$ and $ao$ in the intermediate plate $cp$ and in the sprocket-wheel $a$, respectively. The outer portion of the latch or arm $l^2$ projects through and is movable to and fro in a lateral opening $oc$ in the side or rim of the containing-case $c$.

Figures 5, 6, 7, 8:
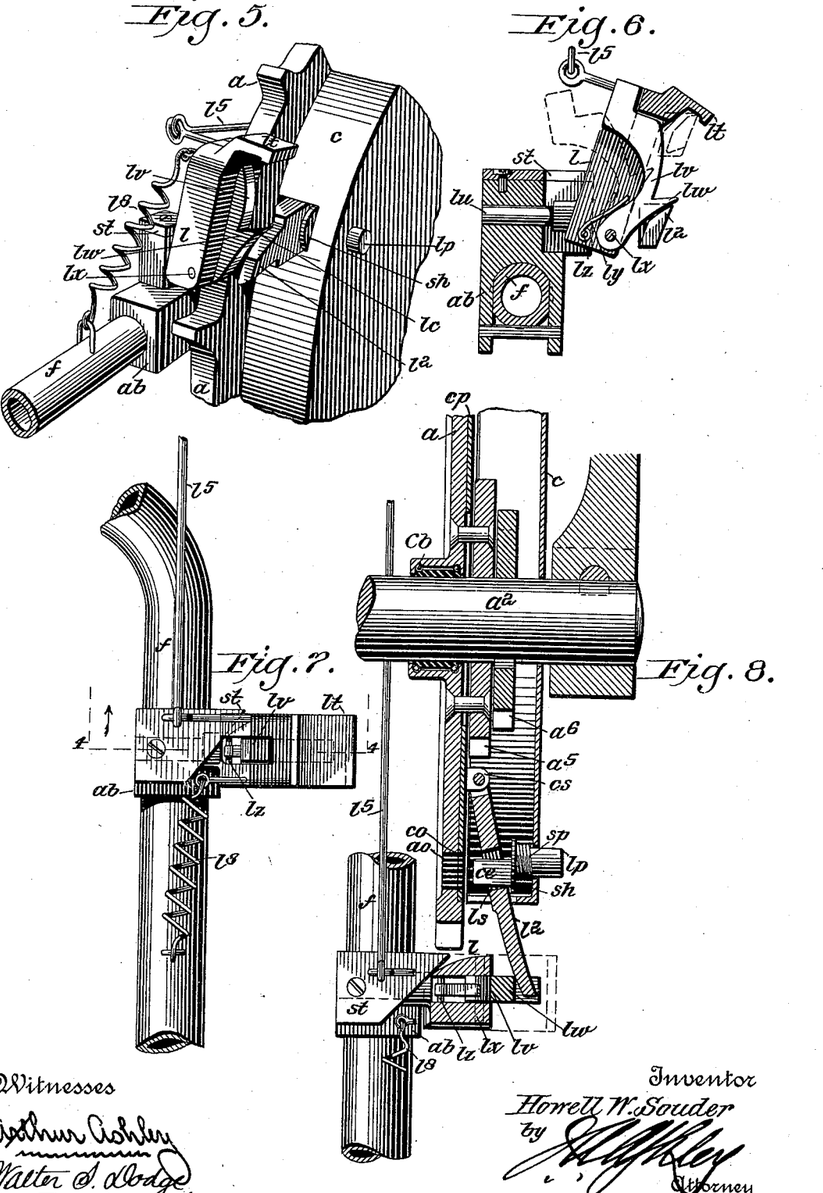
Fig. 5 is a detail perspective elevation further showing portions of the mechanism for varying the leverage, including the bearing upon which is mounted the pivoted lock which acts in conjunction with the spring-compressing arm or latch within the gear-containing case.
Fig. 6 is a vertical central section through Fig. 7, as in the line 4 4 of that figure.
Fig. 7 represents a top plan view of the leverage-changing mechanism in connection with one of the rear bars of the frame of the machine.
Fig. 8 is a longitudinal vertical section through the sprocket-wheel and containing-case, as shown in part in Fig. 3, but showing in addition the locking mechanism as connected with the rear portion of the frame.

The gear-changing or gear-shifting mechanism is further illustrated in Figs. 5, 6, 7, and 8, Sheet 3, wherein in Fig. 5 the outer portion of the arm $l^2$ is seen projecting through the opening $oc$ in the periphery of the case $c$, and in contact with the under surface of the projecting beveled arm or seat $lw$ of a catch or stop $lv$, which is mounted upon a pivot-pin $lx$, which extends transversely through the lower portion of the shifting lock $l$. The lock $l$ is itself pivoted upon the pin or journal $lu$, which extends through the base or seat $ab$ upon the frame $f$, so that the lock or stop, as a whole, has movement upon its axis $lu$, in plane with the movement of the sprocket-wheel and containing-case. Behind the catch $lv$ and bearing upon it is provided a holding spring $ly$, which is suitably secured by a rivet or analogous means $lz$. The upper extremity of the lock $l$ terminates in a stop or hooked projection $lt$, and upon the upper extremity of the seat $ab$ is secured a stop-plate $st$, the extremity of which projects into the space between the body of the lock $l$ and the periphery of the sprocket-wheel $a$ and limits the pivotal movement of the lock $l$ toward the sprocket-wheel.

Figure 9:
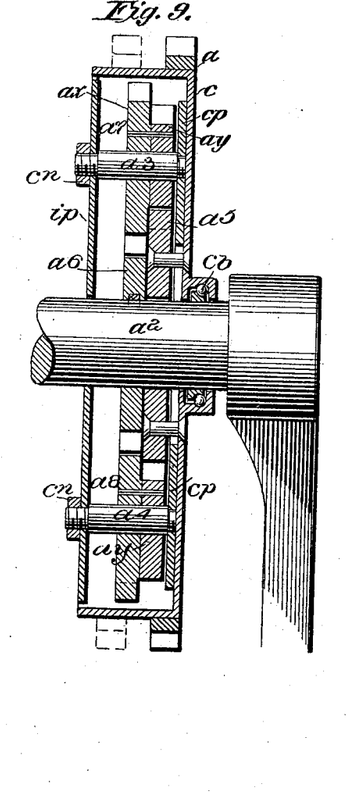
Fig. 9 is a vertical central section showing a preferred form of construction of combined sprocket-wheel and gear-changing mechanism, the united parts being much diminished in thickness and the sprocket-wheel and the cog-gearing being reversed in direction from the arrangement represented in Figs. 1, 2, 3, and 4.

Under the construction represented in Fig. 9 the spindles or journals of the double-geared wheels $a^7$ and $a^8$ are connected to the intermediate plate $cp$ by a tapped opening and screw instead of being formed integrally with the plate, as in the foregoing figures, and a sprocket-ring is applied directly upon the periphery of the containing-case instead of alongside of it, as in preceding figures. When connected in this manner, the sprocket-ring may be applied to encircle the case $c$ at either edge of the same or at any desired point between the two edges, as may become necessary to produce alignment with the sprocket-gear upon the hub of the propeller-wheel. It will be observed that in this figure the intermediate plate $cp$ is seated upon the inner face or bottom of the pan-like case $c$, and that the opposite open extremity of the case is closed by an independent plate or lid $ip$, which is suitably perforated to be received upon shoulders near the outer extremity of the spindles or journals $a^3$ and $a^4$, where it is secured by nuts, as in the already-described construction.

Figure 10:
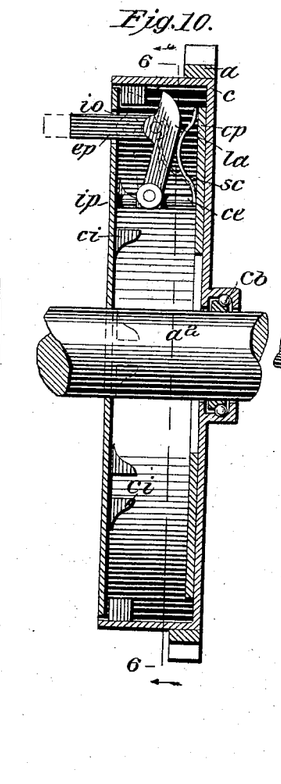
Fig. 10 is a central section of sprocket-wheel and containing-case, as in the line 5 5 of Fig. 11.
Figure 11:
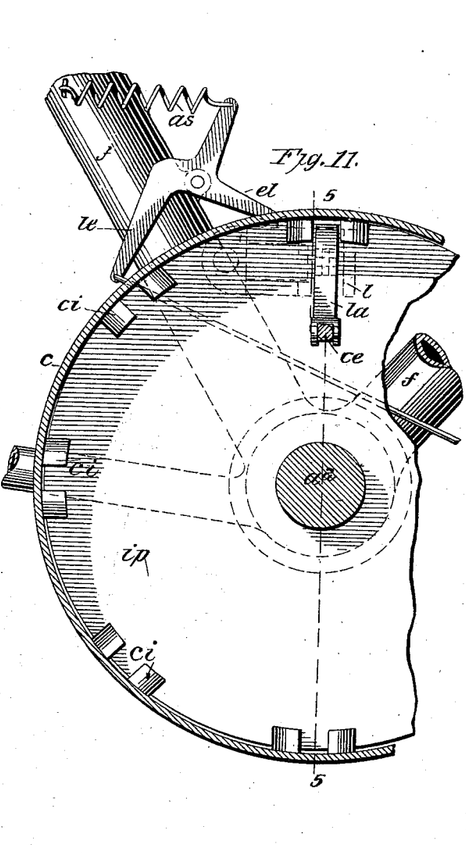
Fig. 11 represents a sectional elevation of the sprocket-wheel and gear-containing case, as in the line 6 6 of Fig. 10.

In Figs. 10 and 11 of Sheet 4 is represented a modification of the construction of a portion of the gear-shifting mechanism, in which, at regular intervals within the case and along the margin of the independent closing-plate $ip$ thereof, are provided stops or catches $ci$, which are arranged in pairs at a short distance apart, are inclined upon the outer face of each member, and are adapted to operate in connection with a spring-actuated latch or dog $la$, which, at a point about midway between the shaft $a^2$ and the periphery of the containing-case $c$, is pivoted upon a transversely-extending shaft or bar $ce$, which bears also the actuating-spring $sc$. Upon that side of the latch $la$ which is coincident with the closing-plate $ip$, and extending through an opening $io$ therein, is pivoted an engaging-pin $ep$, which is operated in connection with the pivoted lock $l$, which is opposite thereto upon the exterior of the sprocket-case, as will be seen in dotted lines in Fig. 11, the lock itself being connected for operation with the bell-crank lever $le$ and its actuating-spring $as$ upon the frame $f$ of the machine.

Figures 12, 12A, 13, 14, 15, 16:
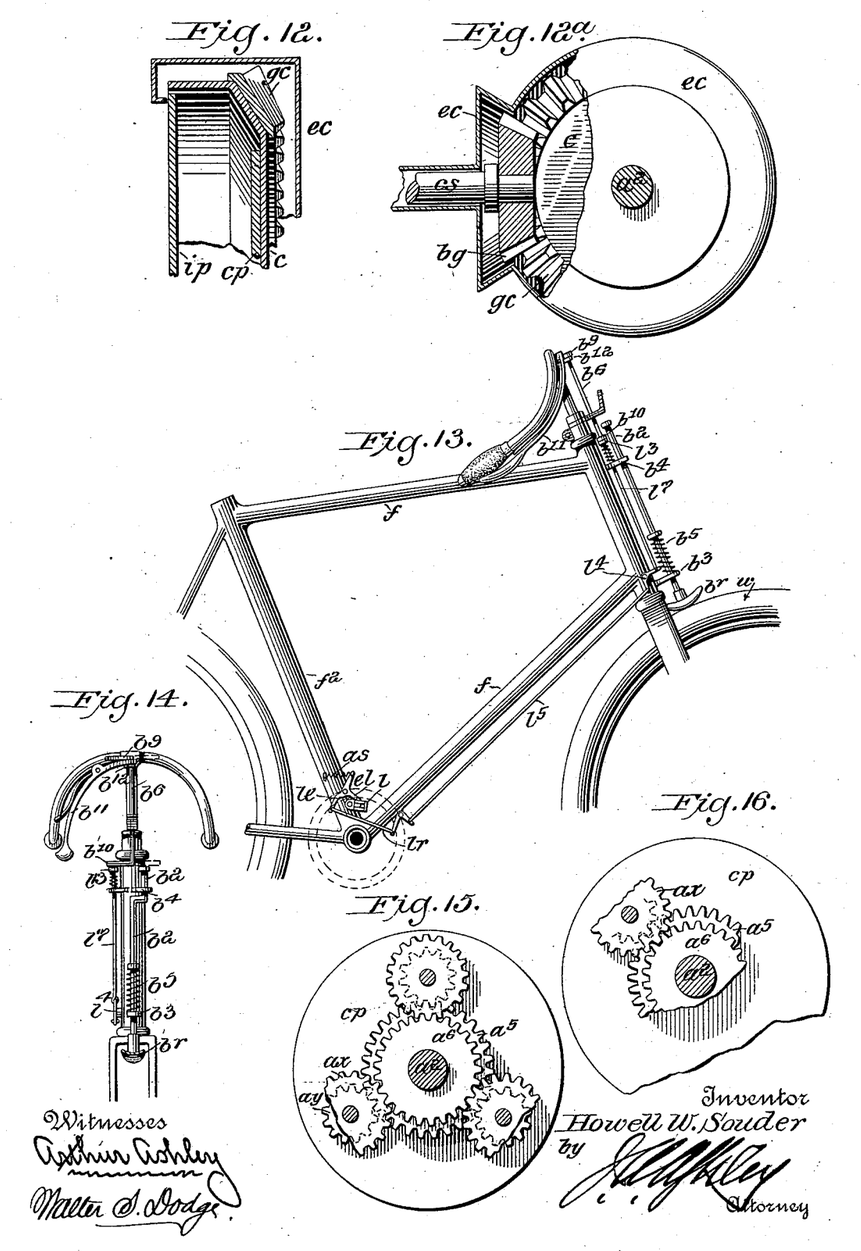

In Figs. 12 and 12$^\text{a}$ is represented a portion of a velocipede in which propulsion is effected without employment of a connecting-chain, the part $c$ in Fig. 12 corresponding to the containing-case $c$ in preceding figures, and $cp$ and $ip$ designating, respectively, the intermediate plate and the independent closing or covering plate, (seen in Figs. 9 and 10,) the whole being suitably protected by an exterior casing $ec$, which is preferably composed of aluminum. The containing-case $c$ at the angle of its periphery is beveled or provided with a double angle to receive the bevel-gear $gc$, which, operated by the treadle-shaft $a^2$, in turn imparts motion to the bevel gear-wheel $bg$, which serves to operate the longitudinally-extending shaft $cs$ and the propelling-wheel.

Under the construction represented in Fig. 13, in which, as well as in Fig. 11, the invention is shown in connection with a diamond frame, the arrangement of rods and levers is closely analogous to that already described in connection with Fig. 1; but by reason of the introduction of the additional elbow-lever $le$ upon the transverse member $f^2$ of the frame $f$, the retracting-spring $as$, and the short connecting-rod $lr$, each as already seen in Fig. 11, the operation of the parts is essentially reversed, downward pressure upon the auxiliary brake-rod $b^6$ serving to depress the outer arm of the lever $l^4$ to thrust toward the rear the rod $l^5$ and to cause the short connecting-rod $lr$ to move the arm $el$ and the attached lock $l$ inwardly, overcoming the resistance of the lock-unclosing spring $as$ and disengaging the latch $la$, Fig. 10.

In the plan view, Fig. 1$^\text{a}$, and in the front elevation, Fig. 14, the two-fold function of the parts already referred to, in connection with Figs. 1 and 13, is more clearly apparent, the adaptability of the toe $b^{10}$, at the foot of the rod $b^6$, for operating either the brake-rod $b^2$ or the connecting-rod $l^7$ of the gear-shifting mechanism, being fully indicated in the two former figures.

Additional strength and additional leverage are gained under the construction shown in Fig. 16, through the provision of a third double-gear auxiliary wheel; but under many conditions and in most situations a single double-gear wheel, as in Fig. 16, will operate with equal effectivenesss.

From the construction shown in Figs. 5 to 8, inclusive, in which the engaging or latch-lifting mechanism is represented, it will be apparent that in the outward or disengaging movement of the latch $l^2$ of the sprocket-wheel mechanism, the catch $lv$, which is centrally pivoted in the body of the pivoted lock $l$, will, in opposition to the spring $ly$, be pressed backward until the latch $l^2$ in its upward movement has passed the point of the seat $lw$ upon the catch $lv$, when, the movement being slightly further continued, the projecting portion of the latch will be brought into contact with the stop or hooked projection $lt$ at the extremity of the pivoted lock $l$, at which point it will remain until the wheelman finds it necessary or desirable to change the adjustment, the seat $lw$ of the catch then serving to prevent backward movement of the arm or latch $l^2$.

It will be obvious that the described locking mechanism may without essential modification be readily applied to velocipedes the frames of which are of other than the diamond pattern.

Figure 17:
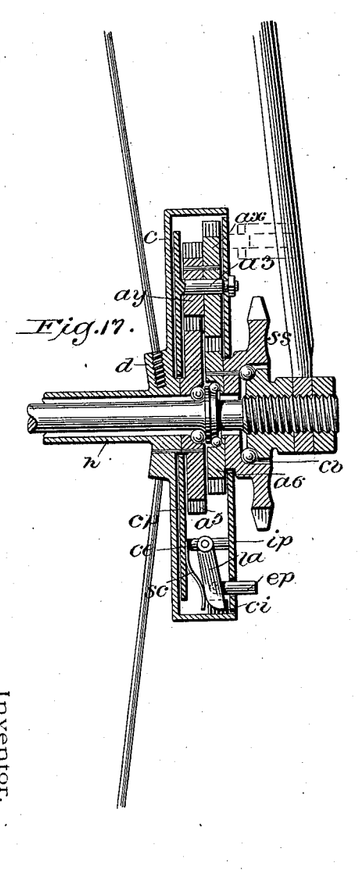
Fig. 17 represents a section through the hub, shaft, sprocket-wheel, and locking-appliances of the rear wheel of the vehicle.

Fig. 17 is designed to represent the application of the gear-shifting mechanism to the small sprocket-wheel $s$ $s$ upon the driving or propelling wheel $d$ of the vehicle, with the purpose, as already stated, of doubling the number of gear-adjustments of the same—that is, to provide for the choice of the cyclist four dissimilar rates of speed and four distinct and unequal degrees of leverage or propulsive power. In this figure, as will be observed, the sprocket-wheel $s$ $s$ is mounted at one side of, and independent of, the gear-containing case $c$. It is secured to, and made revoluble with, the primary wheel $a^6$ of the shifting mechanism, and its revolution is normally independent of that of its wheel-shaft. On the other hand the hub $h$, the case $c$, and the secondary gear-wheel $a^5$ are rigidly united for joint revolution, while the two circular open disks—that is, the intermediate plate $cp$ and the coincident independent outer plate $ip$ are united, as in the other sprocket-wheel, by means of the spindles or journals $a^3$.

From the construction represented in Figs. 1, 1ª, 13, and 14, and from the detailed description thereof, the operation of the brake-rod $b^2$ and the mechanism immediately connected therewith will be apparent. When it is desired to depress the connecting-rod $l^7$ the auxiliary rod $b^6$ will, by its toe $b^{10}$, be engaged with the cap $l^{13}$ of such connecting-rod. If the toe of the auxiliary rod be not already in line with the cap of the connecting-rod, a slight axial movement of the cap or arm $b^9$ of the auxiliary rod, effected by a finger or thumb of the operator, will instantly bring them into coincidence, as seen in Figs. 1, 13, and 14. In this position movement of the handle or lever $b^{11}$, in such manner as to depress the secondary rod $b^6$, will cause corresponding depression of the connecting-rod $l^7$, and through it a retracting movement of the rods and levers by which it is connected with the locking mechanism, as already explained. Pivotal movement of the cap or arm $b^9$, which constitutes the upper extremity of the auxiliary rod $b^6$, from the position represented in full lines in Figs. 1 and 14 to the position indicated in dotted lines in those figures, causes corresponding movement of the toe $b^{10}$ of such rod—that is, from its engagement with the head or cap $l^{13}$ of the connecting-rod $l^7$ to engagement with the head of the brake-rod $b^2$—in which position the operator is enabled, through the auxiliary rod, to exert downward pressure upon the brake-rod and thus bring the brake-shoe $br$ into engagement with the wheel $w$ of the vehicle.

It will be noted that in the described construction (see especially Figs. 1, 5, and 8) the lock upon the frame is located and is movable in vertical plane with the sprocket-wheel, and it will be obvious that in whatever manner the lock is supported upon the frame it must be in such coincidence with the sprocket-wheel that the arm or latch of such wheel shall be engageable with the lock.

The operation of the gear-shifting mechanism will be understood, in the main, from observation of the figures in the drawings and from the foregoing description of the construction and arrangement of its component parts. The sprocket-wheel and the primary central gear-wheel $a^5$, which is in effect simply an extension or engaging attachment of the sprocket-wheel, being normally free to revolve independently of the power-shaft, the secondary gear-wheel $a^6$ being rigidly secured upon the power-shaft, and in engagement with the larger member of the double-gear wheel upon the independent intermediate auxiliary plate, the smaller member of the double-gear wheel upon the independent auxiliary plate being in engagement with the rigid extension or gear-surface $a^5$ upon the sprocket-wheel, and the sprocket-wheel and the independent auxiliary plate which carries the double or two-way wheel being adapted, as set forth, to be united in diverse ways for joint revolution, and to be disconnected to permit the smaller member of the double wheel to act directly upon the extension or engaging attachment of the sprocket-wheel, it follows that in the operation of the vehicle for ordinary purposes it will be desirable that the sprocket-wheel and the independent auxiliary plate and its attachments shall be connected together, so as to revolve as one for high gear, and consequent greatest attainable rapidity of movement; but when an ascent is to be surmounted and it becomes necessary or desirable to obtain an increase of power, at a sacrifice of speed, the operator may instantly, by a simple movement of the auxiliary rod $b^6$ and the brake-arm $b^{11}$, as already explained, detach or withdraw the engaging-pin which unites the sprocket-wheel and the independent plate, and thus cause direct engagement of the smaller of the series of gear-wheels with the geared attachment or toothed extension of the sprocket-wheel. In other words, when the pin-carrying latch is thrown back, and the pin or detent is held out of engagement with the sprocket-wheel and with the independent auxiliary plate, the motion imparted by the power-shaft to the wheel $a^6$ is transmitted through the larger member $ax$ to the smaller member $ay$, of the double wheel or wheels, and from the latter to the fixed extension or engaging attachment $a^5$ of the sprocket-wheel, reducing the speed, and increasing the power exerted by that wheel.

When the small as well as the large sprocket-wheel is provided with the gear-shifting mechanism, as described and shown, it will be apparent that four distinct gear-adjustments and four distinct advantageous results therefrom will be obtained—that is, first, high gear, for ordinary grades; second, low gear, by means of the described mechanism, in connection with the large sprocket-wheel; third, low-gear, by means of the shifting mechanism in connection with the small sprocket-wheel and its driving-wheel, and, fourth, a lower low gear, by means of the low-gear mechanism in connection with the large sprocket-wheel, in connection with the low-gear mechanism upon the sprocket of the driving-wheel, the two low-gear mechanisms being operated simultaneously.

The invention having been thus described, what is claimed is—

1. In a velocipede, the combination with a sprocket-wheel which is provided with a pivoted peripheral engaging arm or latch, and which is provided also with a series of interconnected wheels; of a means, embracing a lock which is mounted upon the frame of the velocipede, which is movable as a whole toward or from the periphery of the sprocket-wheel, and which is movable as to its latch-engaging member at a right angle to the plane of its movement as a whole; and a connection, substantially as set forth, between such lock and the brake-arm or lever, whereby the interconnected wheels are caused to operate either in connection with the frame of the vehicle, or in connection with the sprocket-wheel thereof.

2. In a velocipede, a sprocket-wheel upon which is provided a series of interconnected wheels which are connected for actuation, to the power-shaft, and which are adapted to vary the leverage exerted upon the propelling-wheel; a lock, which is operatively mounted upon the frame of the vehicle, and which is movable, in plane with the sprocket-wheel; toward or from the periphery of such wheel, an arm or latch, upon the sprocket-wheel and projecting peripherally therefrom; and a connection between the brake-arm or lever and the lock upon the frame, whereby at the will of the rider, the lock may be operated in conjunction with the arm or latch, to change the relation of the interconnected wheels to the frame, and to the sprocket-wheel of the machine; combined for operation, substantially as described.

3. A velocipede which is provided, in connection with the sprocket-wheel and power-shaft thereof, with a primary central gear-wheel which is received upon the power-shaft, and is secured to the sprocket-wheel; an intermediate plate which is received between the body of the sprocket-wheel and the primary central gear-wheel, and which has a central opening the periphery of which extends beyond or encircles the connections of the primary central gear-wheel with the sprocket-wheel; a secondary central gear-wheel which overlies the primary gear-wheel and is secured to the power-shaft; a double gear-wheel, exterior to the plane of the central gear-wheels, loosely mounted upon a journal or spindle which projects from the intermediate plate; an arm or latch which carries a pin or detent which engages both the intermediate plate and the body of the sprocket-wheel, and which is operatively mounted upon the intermediate plate; a lock, mounted upon the frame of the machine; and a means, operative from the saddle, whereby, at will, the lock is caused either to engage with or to be disengaged from the arm or latch upon the intermediate plate.

4. In a velocipede, a power-shaft; a sprocket-wheel which is loosely-mounted upon the power-shaft; a circular plate or disk which is received upon the power-shaft, alongside the sprocket-wheel; a primary central gear-wheel which is loosely-received upon the power-shaft, which overlies the circular plate or disk, and which is rigidly connected to the sprocket-wheel,—the disk being loosely embraced between the two wheels;—a secondary gear-wheel which overlies the primary gear-wheel, and which is fixed upon the power-shaft; a double gear-wheel which is revoluble upon a journal or spindle which projects from the circular plate or disk, and which is in engagement with both the primary and the secondary gear-wheel, upon the power-shaft; and a locking-appliance or engaging-pin which is mounted upon the plate or disk, and which is adapted to be simultaneously engaged with, or disengaged from an opening in the plate or disk, and an opening in the sprocket-wheel; in combination, substantially as set forth.

5. In a velocipede, a power or pedal-shaft; a sprocket-wheel which is loosely mounted upon the power-shaft; a primary central gear-wheel which is loosely mounted upon the power-shaft, and which is rigidly connected to the spocket-wheel; an intermediate plate or disk which encircles the power-shaft, and the interconnections of the primary gear-wheel and the sprocket-wheel,—in the space between the sprocket-wheel and the primary central gear-wheel;—a secondary central gear-wheel, overlying the primary gear-wheel, and rigidly secured to the power-shaft; a double gear-wheel, exterior to the central gear-wheels, and in engagement with both of such wheels; and a locking-device, actuated by mechanism which is operated from the brake-arm or lever of the vehicle; whereby the sprocket-wheel and the intermediate plate or disk, are connected together for revolution as a whole, or are disconnected to permit independent revolution of the sprocket-wheel.

6. In a velocipede, the combination with the guide and brake-standard, and with the brake-rod thereof, of a vertically and axially movable supplemental or auxiliary rod, mounted in bearings of the standard, above the brake-rod, provided with lateral adjusting and engaging projections as described, operated for downward movement, by the brake-arm or lever, and adapted to engage either the brake-rod proper of the vehicle, or a connecting-mechanism which serves to shift the gearing of the propelling-mechanism;—substantially as specified.

7. In a velocipede, a gear-shifting mechanism, applied upon and operated in connection with the sprocket-wheel; a brake-carrying rod, extending along the lower portion of the brake and guide standard; a connecting-rod, mounted alongside the brake-rod, and connected to actuate the gear-shifting mechanism upon the sprocket-wheel; and a vertically and axially movable auxiliary or supplementary rod, mounted in bearings of the standard, above the brake-rod, operated by the brake-arm or lever, and provided at its lower extremity with an engaging projection by which it is adapted to engage either the brake-rod, or the connecting-rod which operates to adjust the gear-shifting mechanism; in combination, substantially as shown and described.

8. A velocipede in which are combined a main sprocket-wheel which is loose upon the power-shaft, and is normally revoluble independently of such shaft; an independently revoluble annular plate or disk which is received in the body of the sprocket-wheel, and which has a central annular opening which encircles the power-shaft, at a considerable distance therefrom; a primary central gear-wheel which is received upon the power-shaft, which overlies the annular plate or disk, and which is secured to the body of the sprocket-wheel by connections which extend through the central annular shaft-encircling opening in the independently revoluble plate or disk; a secondary central gear-wheel which overlies the primary gear-wheel, and which is revolubly connected to the power-shaft; a journal or spindle,—one or more,—which is secured to the face of the independently revoluble plate or disk; a double gear-wheel which is mounted upon one of the journals or spindles of the independently revoluble plate, which in one part is in engagement with the primary central gear-wheel, and which in its other part is in engagement with the secondary central gear-wheel; an arm or latch which is pivotally mounted upon the independently revoluble plate or disk, which normally is held in engagement with the body of the plate or disk, and with the body of the sprocket-wheel, and which extends radially outward beyond the path of movement of the sprocket-wheel; and a lock which is mounted upon the frame of the velocipede, and which is movable toward or from the arm or latch upon the sprocket-wheel; so that at the will of the wheelman, the sprocket-wheel proper, and the independently revoluble disk or plate, may be united, for revolution as one, or disconnected, for independent revolution of the sprocket-wheel; substantially as described and shown.

HOWELL W. SOUDER.

Witnesses:
W. J. THOMAS,
C. E. COHRIST.